Feb. 3, 1970  R. S. STONE ET AL  3,493,275
VERTICAL SUSPENSION SYSTEM
Filed Dec. 18, 1967  4 Sheets-Sheet 1

INVENTORS
Richard S. Stone
Alfred G. Emslie

Attorney

Feb. 3, 1970  R. S. STONE ET AL  3,493,275
VERTICAL SUSPENSION SYSTEM
Filed Dec. 18, 1967  4 Sheets-Sheet 2

INVENTORS
Richard S. Stone
Alfred G. Emslie

Attorney

Feb. 3, 1970 R. S. STONE ET AL 3,493,275
VERTICAL SUSPENSION SYSTEM
Filed Dec. 18, 1967 4 Sheets-Sheet 4

INVENTORS
Richard S. Stone
Alfred G. Emslie

Attorney

United States Patent Office 3,493,275
Patented Feb. 3, 1970

3,493,275
VERTICAL SUSPENSION SYSTEM
Richard S. Stone, Lexington, and Alfred G. Emslie, Scituate, Mass., assignors to Arthur D. Little, Inc., Cambridge, Mass., a corporation of Massachusetts
Filed Dec. 18, 1967, Ser. No. 691,518
Int. Cl. F16c *39/06*
U.S. Cl. 308—10                                          24 Claims

ABSTRACT OF THE DISCLOSURE

Apparatus having a freely suspended mass, a magnetic field being used as the sole means for suspension. The mass is mounted on a vertically disposed alignment rod which in turn is held in alignment by magnetically-actuated, essentially friction-free bearings.

Many different types of instruments are designed to measure one or more kinds of force acting upon a mass. Such a force may, for example, be gravitational, inertial, electrostatic, electromagnetic, hydrodynamic or hydrostatic; and the instrument may be a gravimeter, accelerometer, electrometer, galvanometer, flow meter or pressure gage.

In most of the prior art instruments of these general types, it has been necessary to suspend the mass by springs, bearings or fine wires which must have certain specific characteristics. Such a construction characterizes almost all of the presently used accelerometers, gravimeters, and galvanometers. (See for example "Introduction to Geophysics" by Benjamin F. Howell, Jr., McGraw-Hill Book Company, Inc., New York, 1959, pp. 70–77 and 211–214 wherein typical seismometers and gravimeters are described.)

The necessity for having to suspend the mass on a mechanical bearing, a wire or spring introduces certain inherent disadvantages into these instruments. For example, the spring constant must be accurately chosen and controlled and the internal friction of the spring taken into account. Moreover, in many such instruments it is customary to incorporate bearing surfaces which introduce some friction into the system. These instruments of the prior art are sensitive to temperature changes brought about by thermally induced changes in physical properties of the components. Many of these instruments are of necessity quite delicate, usually requiring large bulky housings and extremely careful handling. Finally, some of these instruments require comparatively long periods of time to operate to obtain a series of readings. These operational difficulties in turn seriously limit the range of the design parameters of these instruments, and they have prevented the attainment of any radically new and improved instruments from being developed and used.

There are also available instruments in which a mass is suspended freely in a strong, externally controlled electric field. However, it is always necessary to provide a control system and electrical energy source for such instruments. Thus, those instruments in which the mass is suspended freely are not completely flexible with regard to the locations in which they may be used.

It would, therefore, be desirable to have available an apparatus having a freely suspended mass which is not subject to the drawbacks and disadvantages inherent in instruments in which the mass must be attached to a spring or wire or be supported by bearings, and at the same time represent an improvement over those instruments in which a mass is suspended in an electric field.

It is, therefore, a primary object of this invention to provide a force-balancing apparatus which incorporates a freely suspended mass system, requires a minimum number of external connections, and operates over extended periods of time essentially unaffected by ambient conditions. It is another object of this invention to provide apparatus of the character described which may serve as the active component in a number of different force-balancing instruments for measuring a range of different variables. It is another object of this invention to provide such an apparatus which is a mechanically resonant support system in which the mass, restoring force, and damping means can be chosen as essentially independent design parameters.

It is another primary object of this invention to provide a suspension system which can be constructed in a rugged compact form and at least cost than present instruments designed to perform similar functions. It is yet another object of this invention to provide improved instruments which depend upon the detection and measurement of relative motion of a mass and its surroundings including, but not limited to, such instruments as accelerometers, seismometers, gravimeters, galvanometers, electrometers, flow meters, and pressure gages. Other objects of the invention will in part be obvious and will in part be apparent hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which FIG. 1 is a longitudinal cross section of a mass suspension system constructed in accordance with this invention employing a permanent magnet as the mass;

The suspension system of this invention is designed freely to suspend a mass in what is termed the vertical direction. More precisely, such suspension may be defined as colinear with any inertial or gravitational field. The force of such a field may be small, but must be greater than zero. As will be apparent in the following detailed discussion, some of the various embodiments and modifications are particularly suited for use under conditions wherein the gravitational force is less than that normally experienced on earth.

The vertical suspension system of this invention employs a magnetically responsive suspended mass affixed to a vertical alignment rod which is maintained in proper alignment by diamagnetic bearings. The rod may be permitted to rotate if desired. A magnetic field having specific flux characteristics is provided as the force to suspend the magnetically responsive suspended mass, which may be a permanent magnet or may be a body formed of a paramagnetic or a diamagnetic material. Means are also provided for detecting the relative movement (vertical and/or rotational) of the mass with respect to its housing or surroundings.

Figure 1:
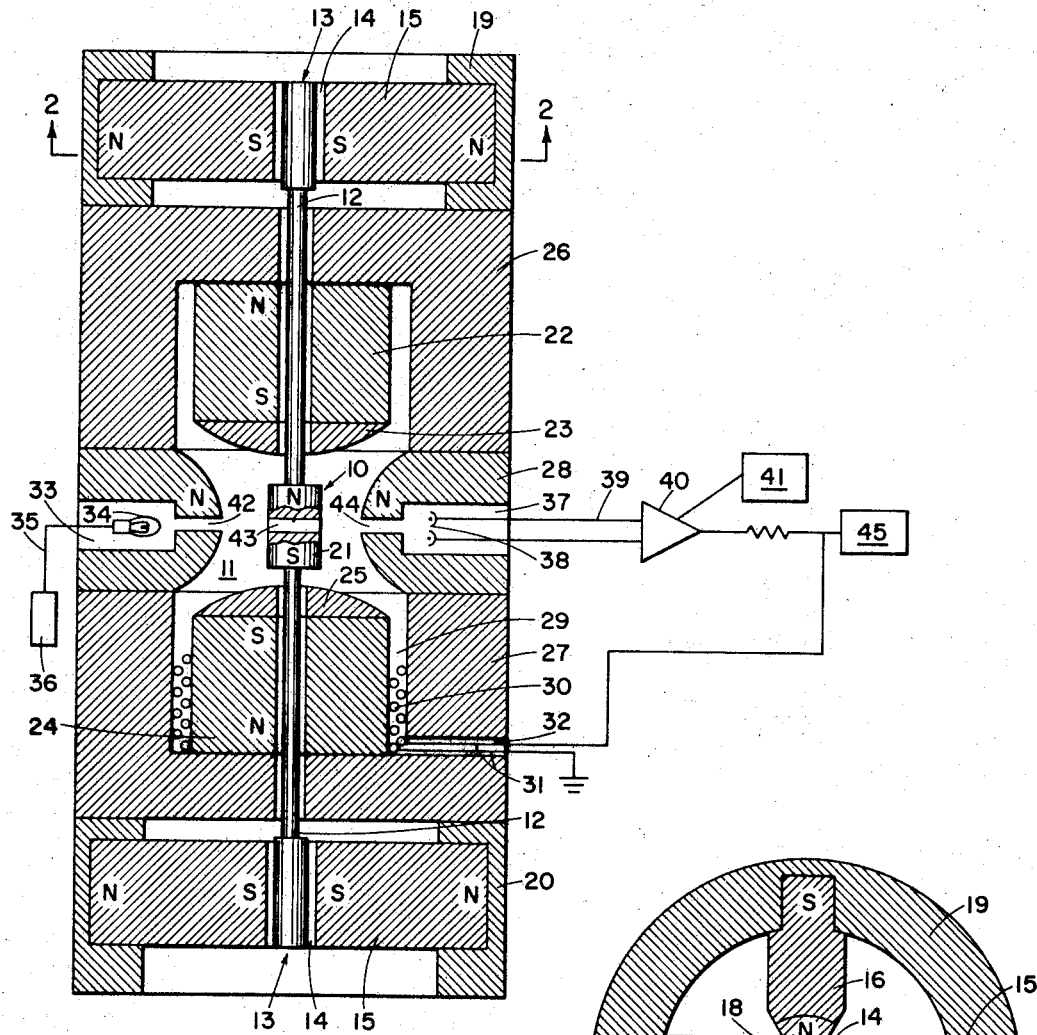
Figure 2:
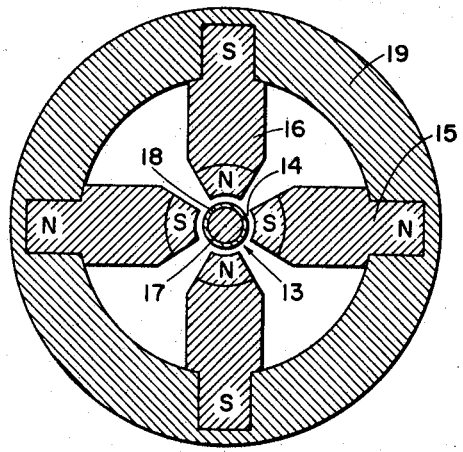
FIG. 2 is a cross section taken along line 2—2 of FIG 1 showing one embodiment of a diamagnetic bearing for achieving vertical alignment, which at the same time permits rotation about the vertical axis and vertical translation of the suspended mass.

FIG. 1 illustrates an embodiment of a suspension system constructed in accordance with this invention. A magnetically responsive suspended mass 10 (in this case a permanent magnet) is held freely in a magnetic field 11 through magnetic forces to be described in detail. The suspended mass 10 is mounted on a vertical alignment rod 12, terminating at both ends in a diamagnetic mass 13 which is positioned within an opening 14 defined by the poles of a plurality of magnets 15 and 16 as shown in FIG. 2. These magnets are arranged circumferentially to alternate in polarity so as to define within opening 14 a magnetic field, the flux intensity of which decreases rapidly from the surface of the magnets to the center of the established field. Thus, there is formed what may be termed a diamagnetic bearing wherein the diamagnetic mass 13, acting as a "journal," is maintained in spaced relationship and out of contact with the magnet surfaces. Since the diamagnetic masses are repelled by the magnetic fields, they and rod 12 are maintained in axial alignment without any surface contact being made between the journal 13 and the race defined by the magnet surfaces. Thus, there is provided a bearing system which is free from any surface contact-generated friction.

The diamagnetic mass 13 is shown in FIG. 2 to comprise a diamagnetic solid cylinder 17 having a copper sheath 18. This construction provides one form of a damping means designed to provide a predetermined dragging force which opposes the motion of the suspended mass and which is proportional to the velocity of the vertical motion. The copper sheath 18 (which may also, of course, be constructed of any other suitable electrically conducting material) serves to enhance the electrical conducting properties of the journal element so as to achieve eddy current damping. Such enhancement of the electrical conducting properties of the diamagnetic mass need not be necessary if the diamagnetic material exhibits sufficient electrical conductivity. For example, if the diamagnetic material is graphite, it will probably be desirable to cover it with a thin sheath of copper or aluminum. However, if the diamagnetic material is beryllium, this may not be necessary. Other forms of damping means will be illustrated and described.

In a copending application filed in the names of Alfred G. Emslie and Ivan Simon, Ser. No. 691,576, and assigned to the same assignee as the present application, there are disclosed a number of embodiments of diamagnetic bearings which are suitable for incorporation in the suspension system of this invention. Three such embodiments of diamagnetic bearings are illustrated in the embodiments of the suspension system described herein.

The purpose of the bearing means provided in the apparatus of this invention is twofold—to provide sufficient torque to prevent the rod 12 from rotating about a horizontal axis and to provide a sufficient transverse force to prevent any appreciable horizontal translational motion of the rod from its equilibrium position. As will be apparent in the discussion of FIGS. 4 and 13, modifications of the bearing means as shown in FIG. 1 are possible.

The upper diamagnetic bearing is held in a mounting ring 19, and the lower diamagnetic bearing which is shown to be identical to the upper one is held in a support ring 20 which in this embodiment serves also as a base or support for the entire apparatus.

In the embodiment of FIG. 1, the suspended mass is illustrated as a permanent magnet 21. The means for developing the magnetic field for suspending magnet 21 will be seen to comprise an upper permanent magnet 22 having a soft iron pole piece 23 and a lower permanent magnet 24 having a soft iron pole piece 25. The upper magnet and its pole piece is affixed to an upper housing section 26 and the lower magnet and its pole piece to a lower housing section 27. Between the two housing sections is an annular ring 28 formed of soft iron. Its role is that of a magnetic field shaping means. The use of ring 28 is preferable, and it may assume various configurations. However, it is preferable to make it with a contoured inner surface as shown. The two housing sections 26 and 27 are also formed of soft iron so that these three components form a structure which conducts the magnetic flux and which completely encloses the magnetic field producing means to provide an effective shield against external magnetic influences. It is also, of course, within the scope of this invention to make either or both of the housing sections integral with the annular ring 28.

The pole pieces 23 and 25 and the inner surface of the soft iron ring 28 are shown in FIG. 1 to be of a general hyperbolic configuration, this being a preferred configuration for zero restoring force in an apparatus where the suspended mass is a permanent magnet. The restoring force can, however, be varied by varying the pole faces and annular ring face configurations.

It will be seen that upper magnet 22 and lower magnet 24 are so oriented as to present like poles facing each other, i.e., south poles in FIG. 1. This arrangement in turn imparts an opposite polarity to the inner portion of the field shaping ring 28, an arrangement which provides a magnetic field having a flux intensity which is greatest at the periphery of the magnetic field and decreases toward the center.

It will be seen that the permanent magnet 21 in FIG. 1 is oriented so that the pole facing the lower magnet is of the same polarity as pole piece 25, and the pole facing the upper magnet is of the opposite polarity as pole piece 23. This means that the permanent magnet 21 experiences a repelling force acting upon its lower end and an attracting force acting upon its upper end. It is, thus, possible to suspend the mass 21 along with the rod 12 and its two associated diamagnetic masses 13 so that this assembly remains positioned within the magnetic field without any such support as a fire or spring, if the combination of repelling forces and attracting forces is sufficient to overcome the gravitational force on this vertical assembly. Thus, the arrangement of FIG. 1 is particularly suited for an instrument where the gravitational force is an important factor in freely suspending the mass.

In the annular volume 29 defined between magnet 24 and housing 27 there are coils 30 which are connected through lead wires 31 (passing through channels 32) to circuitry to be described. Coils 30 are designed to serve as forcing coils, and they may be made responsive to any relative movement between mass 21 and the remaining apparatus to provide a feedback circuit, which in turn can be used to hold the suspended mass 21 constant relative to the frame of the instrument. In such an arrangement, the amount of feedback current becomes a measure of the relative movement. Alternatively, the coils may be made part of a circuit in which relative movement of the suspended mass is used to actuate power supply means connected to the coils to provide sufficient power to force the mass to return to its null or equilibrium position subsequent to detection of such motion. Such a circuit may also be designed to provide an external means for damping the movement of the suspended mass.

There are, of course, a number of systems available for detecting and recording the relative movement of the mass and housing. An optical system is illustrated in FIG. 1. A recess 33 is formed on one side of the annular ring 28, and in it is positioned a radiant energy source 34 connected through lead wires 35 to a suitable power source 36. A second recess 37, directly opposite recess 34, is drilled in the annular soft iron ring 28, and in it are positioned two balanced detectors 38 attached through lead wires 39 to a differential amplifier 40 connected to power source 41. A small passage 42 is drilled through one side of ring 28, and a corresponding passage 43 is drilled in the permanent magnet 21 and another passage 44 in the opposite side of the soft iron ring 28, so that when the suspended mass 21 is in its null position, passages 42, 43, and 44 are in alignment; and the output from the detectors 38 to differential amplifier 40 is balanced. Relative motion of mass 21 will cause an imbalance in the detectors 38, which is then transmitted to differential amplifier 40. This imbalance may then be observed and recorded such as by means of a chart-recording self-balancing potentiometer 45 and may be used to control the amount of current entering coils 30 to complete a feedback circuit.

The embodiment of FIGS. 1 and 2 is designed to permit rotary motion, if desired, along with the vertical motion of the suspended mass 21. However, it may be desirable to suppress rotation and to limit the motion to translation along the vertical axis. This may be done by a modification in the design of the diamagnetic bearing as shown in fragmentary cross section in FIG. 3. In this modification, the diamagnetic mass 46 (having an electrically conducting sheath 47) at the ends of rod 12 is formed with a square cross section to inhibit rotation, and the opening 48 defined by magnets 49 and 50 is also of a square cross section. Other cross sections may also, of course, be used.

Figure 3:
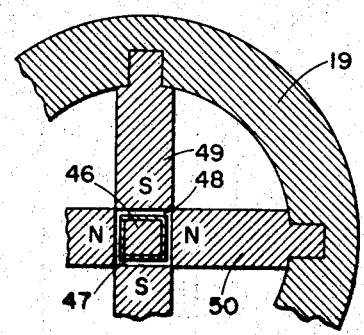
FIG. 3 is a fragmentary cross section corresponding in position to FIG. 2 and showing the diamagnetic bearing embodiment of FIG. 2 modified to prevent any rotation of the suspended mass.
Figure 4:
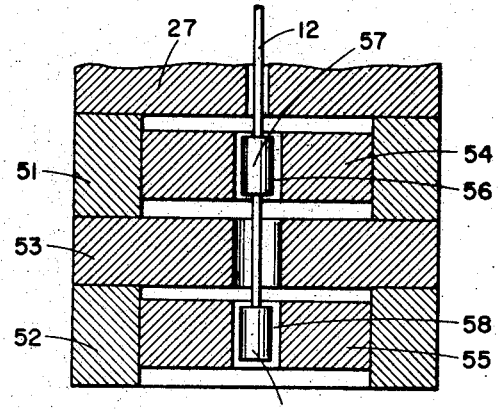
FIG. 4 is a modification, shown in cross section, of the bearing means of FIG. 1.

FIG. 4 illustrates a diamagnetic bearing means which may be used in place of the bearings of FIG. 1. In effect, in the modification of FIG. 4 two diamagnetic bearings are located on one end of rod 12, those in FIG. 4 being below the mass. They may also both be positioned at the top end of the rod. The use of a plurality of such bearings on one end of the rod will normally eliminate the need for any bearing means on the other end, but this does not preclude the use of one or more such bearings on the other end of the rod. In the arrangement of FIG. 4, wherein like reference numerals refer to like components in FIG. 1, the bottom support ring is in two sections 51 and 52 attached through a separator plate 53. Each support ring section 51 and 52 holds magnets 54 and 55, respectively, which are similar in design and function to magnets 15 and 16 of FIG. 1 or 49 and 50 of FIG. 3. Magnets 54 define a magnetic field 56 having the desired flux pattern and in which an upper diamagnetic mass 57, serving as a "journal," is positioned. In like manner, magnets 55 define a magnetic field 58 in which a lower diamagnetic mass 59 is positioned.

The diamagnetic bearing means of FIG. 4 are suitable for use where the suspended mass is a permanent magnet, or is formed of a paramagnetic or diamagnetic material. The lengths and configurations of the diamagnetic masses and their associated magnetic field generating means which make up the bearings must be chosen to provide the required torque and transverse forces previously defined.

Figure 5:
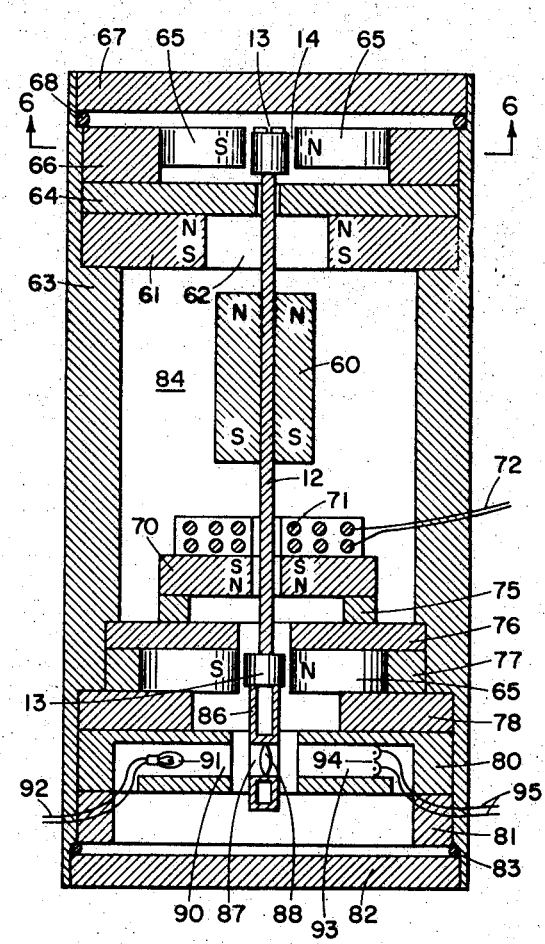
FIG. 5 is a longitudinal cross section of another embodiment of the mass suspension system of this invention employing a permanent magnet as the mass.
Figure 6:
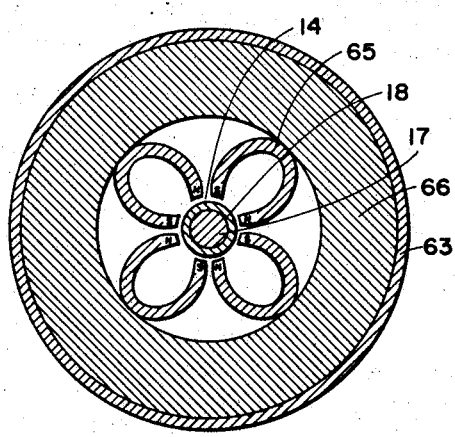
FIG. 6 is a cross section taken along 6—6 of FIG. 5 illustrating another embodiment of a diamagnetic bearing.

FIGS. 5 and 6 illustrate in cross sections another emboidment of the suspension system of this invention. The suspended mass 60 is a permanent magnet, and the magnetic field in which it is suspended is defined between an upper ring magnet 61 and a lower ring magnet 70. The upper ring magnet 61 has a central passage 62 and is supported by housing 63. Above the ring magnet 61 is a separator 64, and above it are a plurality of horseshoe magnets 65 attached to a ring support 66. As will be seen in the cross section of FIG. 6, the horseshoe magnets are oriented to present poles which alternate circumferentially around the diamagnetic mass 13 which, as in the case of FIG. 1, is affixed to the vertical alignment rod 12 and serves as a component of a diamagnetic bearing. The embodiment of FIG. 5 is adapted to be hermetically sealed. This is accomplished at the top through the use of a covering 67 and a sealing ring 68. Lower magnet 70 has a forcing coil 71 which is connected to a suitable power source (not shown) by means of lead wires 72. There are several ways in which magnets 70 may be supported in the proper position within the housing. In FIG. 5, this is accomplished through the use of a series of spacer rings 75, 76, and 77, the bottom one of which serves as a means for retaining and mounting a plurality of horseshoe magnet 65 for providing the necessary magnetic flux field associated with the lower diamagnetic bearing 13. These horseshoe magnets are rested in turn on an annular ring 78 positioned on a detector housing 80, which in turn rests upon another support ring 81. Sealing at the bottom is accomplished through a bottom plate 82 and sealing ring 83.

The diamagnetic mass 17 of the bearings 13 in FIGS. 5 and 6 is shown to have an electrically conducting sheath 18 to achieve eddy curent damping. Alternatively, or in addition to this form of damping means illustrated, damping in the embodiment of FIG. 5 may be achieved or enhanced by a fluid contained within volume 84 defined by the hermetically sealed housing. The fluid may be a gas or liquid which exhibits the correct viscosity to achieve the desired degree of damping. The fluid may also serve to protect the components from contaminants, dust, and the like.

In the embodiment of FIG. 5, one component of an optical detecting means is affixed to the "journal" member of the lower diamagnetic bearing. This component comprises a hollow tube 86 having an aperture 87 in which is positioned a lens 88. A recess 90 is drilled in one side of the detector housing 80, and in it is positioned a source of radiant energy 91 connected through lead wires 92 to a suitable power source not shown. A second recess 93 is drilled in housing 80 directly opposite recess 90, and in it are positioned balanced detectors 94, which are connected to suitable circuitry as in FIG. 1 through lead wires 95.

As in the case of the embodiment of FIG. 1, the mass 60 is suspended freely by virtue of the fact that it experiences a repelling force on the bottom and an attracting force at its top. Coil 71 may be used to reinforce the magnetic field generated by magnet 70 and, if desired, it may be part of a circuit similar to that shown for the embodiment of FIG. 1. The detecting system of FIG. 5 is essentially equivalent to that of FIG. 1, any relative motion of the suspended mass being detected by an imbalance in detectors 94 and measured or recorded in any desired manner.

In the embodiment of FIGS. 5 and 6, the upper magnet 61 has an inside diameter greater than the outside diameter of the supported mass 60. This arrangement prevents any latching which might occur if the upward displacement of the mass 60 were sufficient to bring the mass in contact with the upper magnet. Therefore, in this arrangement when the suspended magnet 60 goes through a sufficient upward transient so that its horizontal center line passes through the horizontal center line of the upper ring magnet 61, the force due to the upper magnet acts with gravity rather than against it, thereby driving the suspended magnet 60 back towards its equilibrium position.

In the arrangement of FIG. 5, there could be two equilibrium positions for the suspended magnet 60 if there were two positions where the total force on the suspended magnet was positive. One would occur at an intermediate position between the two suspending magnets 61 and 70, and the second would occur in the vicinity of the upper magnet 61. This upper equilibrium position can be removed by judicious choice of the size, shape, location, and strength of the support magnets. Thus, this apparatus offers the possibility of providing a suspension system which can be made inherently stable within a wide dynamic range.

Figure 7:
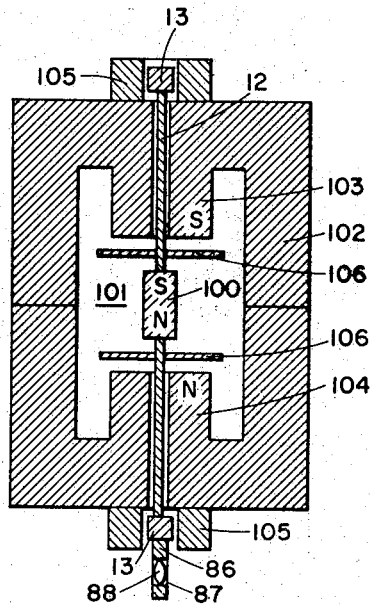
FIG. 7 is a cross section of a suspension system, using a permanent magnet as the suspended mass, particularly suitable where gravitational forces are relatively small.

The embodiment of FIG. 7 is of a relatively simple construction and is particularly suited for suspending a permanent magnet under conditions where the force of gravity is small. The magnet 100 mounted on alignment rod 12 is suspended in a magnetic field 101 which is generated by a magnet 102 having south pole 103 and north pole 104. Magnet 102 thus provides a housing as well as a means for generating the required magnetic field 101. For ease of construction, the magnet may be formed in two pieces as shown. The diamagnetic bearings are comprised of diamagnetic masses 13 and ferromagnetic masses 105 formed as illustrated in FIGS. 2, 3, or 6. It is also possible to employ the modification of the bearing shown in FIG. 4 in the instrument of FIG. 7.

The detecting system of FIG. 7 is similar to that of the instrument of FIG. 5. FIG. 7 illustrates another embodiment of a damping means which may be used on any of the other instrument embodiments illustrated. This damping means comprises one or more rings 106 of electrically conducting material mounted on alignment rod 12. These rings may conveniently be formed of copper or aluminum, and they achieve eddy current damping in essentially the same way that the metal sheaths on the diamagnetic masses of the "journals" in the bearing means do.

When the instrument of FIG. 7 is used under conditions where the gravitational force is small, suspension of the suspended mass 100 is achieved through magnetic repelling forces of essentially equal strength acting on both the top and bottom of the permanent magnet 100.

Figure 8:
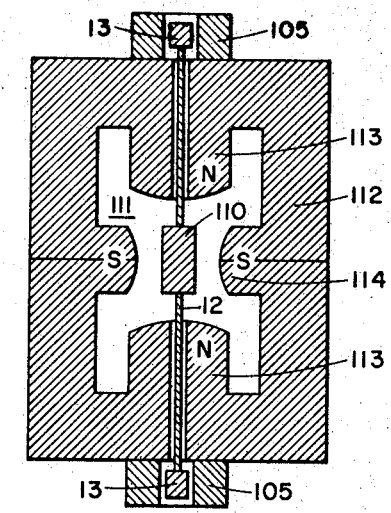
FIG. 8 is a cross section of a suspension system representing a modification of the instrument of FIG. 7 and adapted for use in normal gravitational fields and suitable for suspending a permanent magnet or a body formed of a diamagnetic or paramagnetic material.

In the instrument of FIG. 8, the suspended mass 110 may be a permanent magnet (in which case it is so oriented as to have the south pole on the top and the north pole on the bottom), a paramagnetic body or a diamagnetic body. The magnetic field 111 is generated by a magnet 112 having two vertically positioned north poles 113 and an annular south pole 114.

Figure 9:
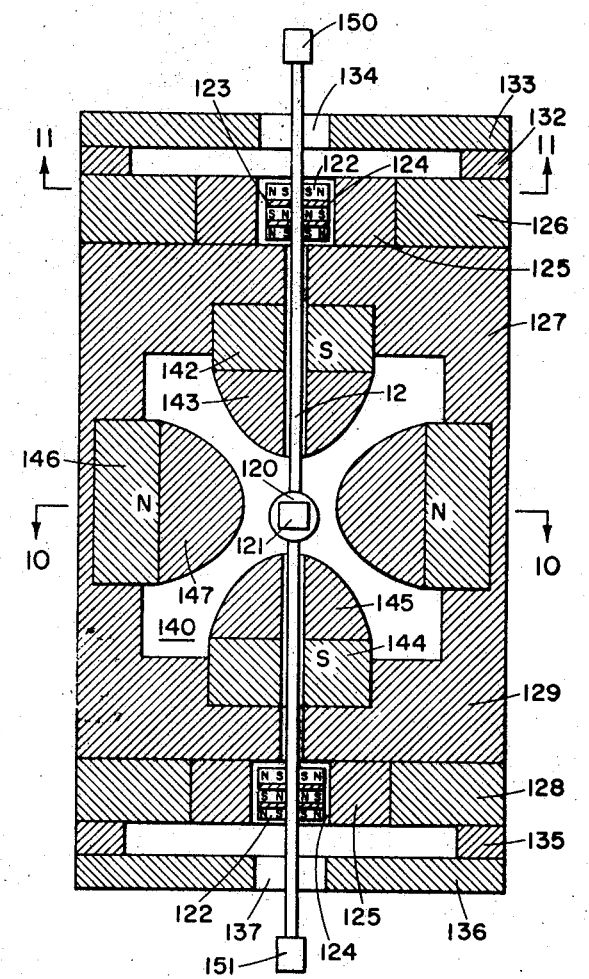
FIG. 9 is a longitudinal cross section of a third embodiment of the suspension system of this invention in which the suspended mass may be a permanent magnet or a body of a diamagnetic or paramagnetic material.
Figure 10:
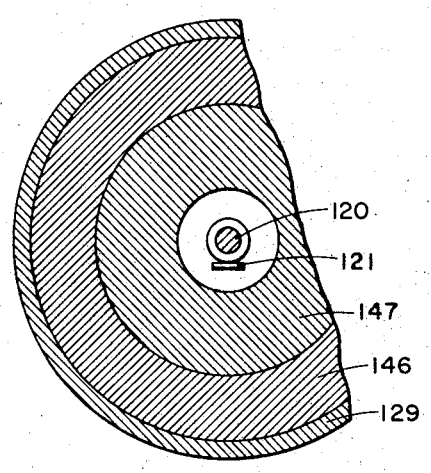
FIG. 10 is a cross section through the magnetic field of the apparatus of FIG. 9 taken along line 10—10 of FIG. 9.
Figure 11:
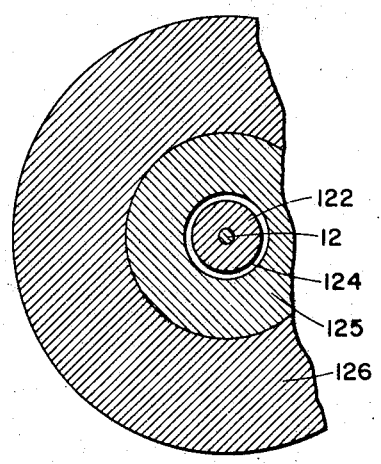
FIG. 11 is a cross section taken along line 11—11 of FIG. 9 showing another embodiment of a diamagnetic bearing.

FIGS. 9, 10, and 11 illustrate yet another embodiment of the suspension system of this invention in which the suspended mass may be formed of a permanent magnet or of a diamagnetic or paramagnetic material. The mass 120 is illustrated to be of a spherical configuration, and in this embodiment is shown to have a small mirror 121 mounted thereon for detecting rotational motion. It will be immediately apparent that such an arrangement would make this suspension system particularly adaptable for use in a galvanometer. The mass 120 is suspended on vertical rod 12, which is maintained in proper alignment by means of a diamagnetic bearing which, in this case, is arranged to have a journal-like component formed of a series of ring magnets 122 held by spacers 123 and arranged such that the polarities alternate axially to provide the necessary magnetic field to maintain a spacing 124 between the magnet surfaces and a diamagnetic ring 125. This is, in effect, a diamagnetic bearing wherein the diamagnetic and ferromagnetic masses are reversed in their positions when compared with the bearings illustrated in FIGS. 1 and 5. The diamagnetic mass 125 is attached through a holding ring 126 to an upper housing section 127. Similarly, the diamagnetic ring mass associated with the lower bearing is attached through ring 128 to a lower housing section 129. An upper spacer ring 132 serves as the means for affixing a cover 133 to the suspension system. This cover has a passage 134 through which rod 12 may extend. In a like manner, lower spacer ring 135 serves as the means for attaching a bottom plate 136 to the housing, this bottom plate having a passage 137 to permit extension of the rod 12 therethrough.

The magnetic field 140 is defined within the upper and lower housing members and is generated by an upper magnet 142 having an essentially hyperbolic pole piece 143, a lower magnet 144 having an essentially hyperbolic pole piece 145, and an annular magnet 146 having its inside diameter contoured to form an essentially hyperbolic cross section ring pole piece 147. The magnets are conveniently held within the upper and lower housing members 127 and 129. It will be seen that by virtue of the fact that the magnets alternate in polarity in circumferential-like fashion, there is created a magnetic field wherein the intensity is greatest where the pole pieces are closest to each other. The flux decreases in intensity as it approaches the center of the magnetic field and hence the center of the spherical suspended mass.

When the suspended mass 120 is formed of a diamagnetic material such as graphite, the mass will tend to be stabilized below the center of the field where the increase in flux intensity provides sufficient upward thrust to balance the gravitational force. Thus, suspension in this case is not a matter of a combination of repelling and attracting forces as in the case of the embodiments of FIGS. 1, 5, and 7; but it is brought about rather by creating a uniform repelling force over and through the entire mass. This embodiment is particularly suitable for use in applications where the force of gravity is small. However, it is not limited to such applications.

If the mass 120 is of a paramagnetic material, it will be stabilized above the center of the field and be so polarized that the bottom part of the mass will be the south pole and the top part the north pole. Since the mass is mounted on alignment rod 12, any radial forces which might tend to displace the mass outwardly are overcome.

Figure 12:
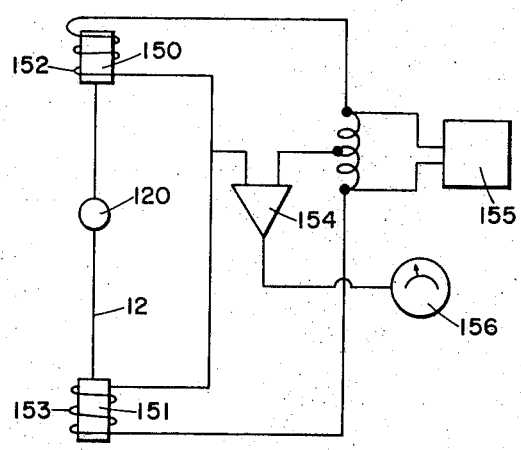
FIG. 12 is a diagrammatic representation of an electrical detecting means as it may be employed with the instrument of FIG. 7.

The suspension system of FIG. 9 has small cores 150 and 151 of an electrically conducting metal such as copper affixed to the upper and lower ends of rod 12. These cores extend beyond the housing and permit any one of a number of well-known detecting systems to be employed for measuring and recording vertical motion, for example the variable inductance device shown in FIG. 12. The cores 150 and 151 have coils 152 and 153 associated with them. As one of the cores moves further into its associated coil, the other core moves further out of its associated coil, thus creating an imbalance in the inductances in the two coils. Such an imbalance can then be used as a measure of the relative motion of the supported mass 120 through any suitable well-known circuitry, which in FIG. 12 comprises a differential amplifier 154, an AC power source 155, and some form of readout such as AC voltmeter 156.

In a similar fashion, the cores 150 and 151 may be a ferromagnetic material, such as iron, moving within a magnetic field to form a variable reluctance detecting means. The detecting means may also employ differential linear transformers. Optical components may also be mounted on the ends of rod 12 and optical or electrooptical means known in the art used to detect rotary and vertical motion.

Figure 13:
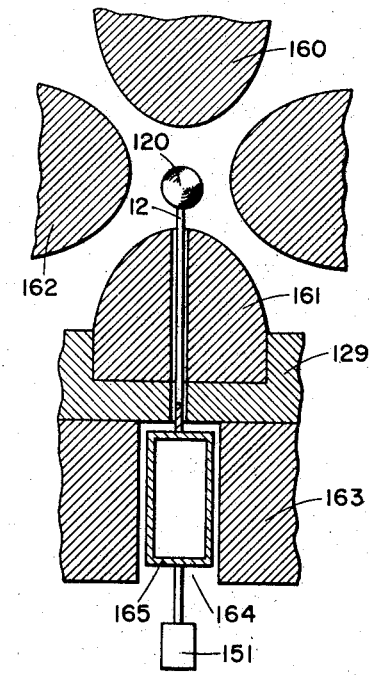
FIG. 13 is a modification of the bearing means which may be used in the apparatus of FIG. 7 when the suspended mass is a diamagnetic body.

In the instrument of FIG. 9, if the suspended mass 120 is a diamagnetic body, the alignment rod may be affixed to only one side of the body and a single bearing used, as illustrated in FIG. 13. This is possible, since there is no tendency in the suspension of a diamagnetic body, in a magnetic field of the type required, for the body to flip over or to be displaced outwardly. In FIG. 13 the upper magnet 160, lower magnet 161, and annular magnet 162 generate the required magnetic field in which the mass 120 is suspended. Alignment rod 12 has a single bearing which comprises a ferromagnetic mass 163, which provides the required magnetic field 164, and a relatively long hollow diamagnetic body 165. Any suitable bearing system described in the previously identified Ser. No. 691,576 may be used as long as it provides the required torque and transverse forces. Alternatively, the rod 12 may be attached to the upper side of the mass 120 and the single bearing located above the upper magnet 160.

In FIGS. 1 and 9 the magnet structures are shown to comprise permanent magnets with the field lines being conducted by soft iron pole pieces. FIGS. 5, 7, 8, and 13 illustrate alternative structures in which the same objective is accomplished by configurations in which the entire magnetic structures, including the pole pieces themselves, are permanent magnets. Such magnet structures are, of course, completely interchangeable in all of the embodiments and modifications. It is also within the scope of this invention to use electromagnets rather than permanent magnets to generate either or both of the magnetic fields required for the free suspension of the mass and the diamagnetic bearings. The interchangeability of electromagnets and permanent magnets is well known in the art. The final choice of the magnet structures will be dictated by the use of the instrument; and the choice of such structures, as well as of the other design parameters, is well within the capabilities of those skilled in the art.

It will be seen from the detailed description of the various embodiments and modifications of the suspension system of this invention that it provides a means for completely freely suspending a mass so that vertical and, if desired, rotational, movement relative to its surroundings may be measured and evaluated. As an example of a use for the apparatus of FIG. 1, we may cite its application to seismology. A device constructed according to FIG. 1 may be placed on the ground; and any movement thereof will be detected, for the housing will move with the ground while the inertia of the mass causes it to remain, at least momentarily, in its original position. The movement of the housing and surroundings relative to the position of the suspended mass is a direct measurement of the seismic motion of the earth. In a similar manner, the gravitational force on the suspended mass as it varies from place to place may be measured.

It will be apparent that these instruments may be made in relatively small sizes, may be hermetically sealed, constructed to have a minimum number of external leads, and assembled to be relatively rugged. This leads to their adaptation for many uses, including, for example, introduction into boreholes for subsurface surveys. Moreover, because the suspension system, as well as the alignment bearings, depends upon magnetic phenomena, the instruments are capable of operating over a wide temperature range (absolute zero to near the Curie point for the magnets) without experiencing any appreciable change in performance.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features in the invention herein described, and all statements of the scope of the invention which, as a matter of language, might be said to fall therebetween.

We claim:

1. A vertical suspension system, comprising in combination
   (a) vertically disposed alignment rod means;
   (b) magnetically-actuated bearing means associated with at least one end of said alignment rod means;
   (c) magnetic field defining means comprising upper and lower magnets positioned in spaced relationship thereby to define between them a magnetic field; and
   (d) a magnetically responsive freely suspended mass affixed to said alignment rod means within said magnetic field which serves as the sole means for suspending said mass.

2. A vertical suspension system in accordance with claim 1 wherein said bearing means provides sufficient torque to prevent said rod from rotating about a horizontal axis and sufficient transverse force to prevent any appreciable horizontal translational motion of said rod from its equilibrium position.

3. A vertical suspension system in accordance with claim 1 wherein said magnetically-actuated bearing means are journal-like bearings comprising first and second coaxially positioned magnetically repelling masses, said first mass being affixed to said alignment rod means to serve as a journal member and said second mass surrounding said first mass and being spaced therefrom.

4. A vertical suspension system in accordance with claim 3 wherein said first mass is diamagnetic and said second mass is formed of magnets, the poles of which are arranged to provide a magnetic field having an intensity which decreases sharply from the surface of said magnets of said second mass.

5. A vertical suspension system in accordance with claim 3 wherein at least one of said bearings is associated with each end of said alignment rod means.

6. A vertical suspension system in accordance with claim 3 wherein a plurality of said bearings is associated with at least one end of said alignment rod means.

7. A vertical suspension system in accordance with claim 1 wherein said magnetic field defining means also includes magnetic field shaping means.

8. A vertical suspension system in accordance with claim 1 wherein said magnetic field defining means also includes driving coil means adapted to apply magnetic forces to said suspended mass.

9. A vertical suspension system in accordance with claim 1 including means for detecting relative motion between said suspended mass and said magnetic field defining means.

10. A vertical suspension system in accordance with claim 1 including damping means adapted to oppose the vertical motion of said suspended mass.

11. A vertical suspension system in accordance with claim 10 wherein said damping means comprises means to effect eddy current damping within said magnetically-actuated bearing means.

12. A vertical suspension system in accordance with claim 10 wherein said damping means comprises at least one electrically conducting member attached to said alignment rod means and positioned within said magnetic field.

13. A vertical suspension system in accordance with claim 10 wherein said damping means comprises a damping fluid contained within said magnetic field surrounding said suspended mass.

14. A vertical suspension system in accordance with claim 10 wherein said damping means comprises an externally applied force actuated by the relative movement of said suspended mass.

15. A vertical suspension system in accordance with claim 1 wherein said suspended mass is a permanent magnet.

16. A vertical suspension system in accordance with claim 1 wherein said suspended mass is a body of a paramagnetic material.

17. A vertical suspension system in accordance with claim 1 wherein said suspended mass is a body of a diamagnetic material.

18. A vertical suspension system, comprising in combination
    (a) a vertically disposed alignment rod;

(b) diamagnetic bearing means associated with at least one end of said rod and adapted to provide sufficient torque to prevent said rod rotating about a horizontal axis and sufficient transverse force to prevent any appreciable horizontal translational motion of said rod from its equilibrium position;

(c) magnetic field defining means comprising upper and lower magnets positioned in spaced relationship thereby to define between them a magnetic field; and (d) a mass affixed to said rod, said mass being a permanent magnet having its poles so oriented as to effect free suspension of said mass within said magnetic field, said magnetic field serving as said sole means for suspending said mass.

19. A vertical suspension system according to claim 18 wherein the facing poles of said magnets comprising said magnetic field defining means are of like polarity, and said permanent magnet forming said mass is oriented as to be repelled by said lower magnet and attracted by said upper magnet.

20. A vertical suspension system acording to claim 18 wherein the facing poles of said magnets comprising said magnetic field defining means are of opposite polarity, and said permanent magnet forming said mass is oriented as to be repelled by said upper and by said lower magnets.

21. A vertical suspension system in accordance with claim 18 having magnetic field shaping means.

22. A vertical suspension system in accordance with claim 18 further characterized by having soft iron housing means adapted to provide shielding from external magnetic fields.

23. A vertical suspension system, comprising in combination (a) vertically disposed alignment rod means;

(b) a diamagnetic mass affixed to said rod means;

(c) diamagnetic bearing means associated with at least one end of said rod means and adapted to provide sufficient torque to prevent said rod means from rotating about a horizontal axis and sufficient transverse force to prevent any appreciable horizontal translational motion of said rod means from its equilibrium position;

(d) magnetic field defining means for generating a magnetic field having a flux density gradient pattern adapted to provide a sufficient upward thrust to balance the gravitational force, whereby said diamagnetic mass is freely suspended.

24. A vertical suspension system in accordance with claim 23 wherein said diamagnetic mass is affixed to one end of said rod means, and said bearing means is associated with the other end of said rod means.

References Cited

UNITED STATES PATENTS

| | | | |
|---|---|---|---|
| 2,733,857 | 2/1956 | Beams | 308—10 |
| 2,856,238 | 10/1958 | Dacus | 308—10 |
| 3,124,962 | 3/1964 | Hirtreiter | 308—10 |
| 3,199,932 | 8/1965 | Clark | 308—10 |
| 3,216,349 | 11/1965 | Kraft | 308—10 |
| 3,221,389 | 12/1965 | Lowell | 308—10 |
| 3,243,238 | 3/1966 | Lyman | 308—10 |
| 3,261,210 | 7/1966 | Buchhold | 308—10 |

MILTON O. HIRSHFIELD, Primary Examiner

R. SKUDY, Assistant Examiner